(12) United States Patent
Liang

(10) Patent No.: US 11,862,158 B2
(45) Date of Patent: Jan. 2, 2024

(54) METHOD AND APPARATUS FOR CONTROLLING DEVICE, AND READABLE STORAGE MEDIUM

(71) Applicant: BEIJING XIAOMI PINECONE ELECTRONICS CO., LTD., Beijing (CN)

(72) Inventor: Chuming Liang, Beijing (CN)

(73) Assignee: BEIJING XIAOMI PINECONE ELECTRONICS CO., LTD., Beijing (CN)

( * ) Notice: Subject to any disclaimer, the term of this patent is extended or adjusted under 35 U.S.C. 154(b) by 208 days.

(21) Appl. No.: 17/381,118

(22) Filed: Jul. 20, 2021

(65) Prior Publication Data

US 2022/0223147 A1 Jul. 14, 2022

(30) Foreign Application Priority Data

Jan. 12, 2021 (CN) .......................... 202110037802.X

(51) Int. Cl.
*G10L 15/22* (2006.01)
*G10L 25/18* (2013.01)
*G10L 25/30* (2013.01)

(52) U.S. Cl.
CPC .............. *G10L 15/22* (2013.01); *G10L 25/18* (2013.01); *G10L 25/30* (2013.01); *G10L 2015/223* (2013.01)

(58) Field of Classification Search
CPC . G10L 15/1815; G10L 15/1822; G10L 15/22; G10L 15/30; G10L 2015/223

USPC .......................................................... 704/275
See application file for complete search history.

(56) References Cited

U.S. PATENT DOCUMENTS

| 10,878,840 | B1  |   | 12/2020 | Mitchell et al. |
|---|---|---|---|---|
| 2016/0210105 | A1 | * | 7/2016 | Ru ........................ H04L 65/65 |
| 2017/0032402 | A1 | * | 2/2017 | Patsiokas ........... G06Q 30/0207 |
| 2020/0105293 | A1 |   | 4/2020 | Mainiero et al. |
| 2020/0265864 | A1 | * | 8/2020 | Markovic .............. G10L 25/18 |

FOREIGN PATENT DOCUMENTS

| CN | 110070863 A | 7/2019 |
|---|---|---|
| CN | 111279414 A | 6/2020 |

OTHER PUBLICATIONS

S. Ghaemmaghami, "Audio segmentation and classification based on a selective analysis scheme," 10th International Multimedia Modelling Conference, 2004. Proceedings., Brisbane, QLD, Australia, 2004, pp. 42-48, doi: 10.1109/MULMM.2004.1264965. (Year: 2004).*

(Continued)

*Primary Examiner* — Bharatkumar S Shah
(74) *Attorney, Agent, or Firm* — COZEN O'CONNOR

(57) ABSTRACT

A method for controlling a device includes: collecting audio data where the device is located; determining whether each target frame of the audio data is a first type signal; in response to the target frame of the audio data being the first type signal, determining an acoustic event type represented by the first type signal; and controlling the device to execute control instructions corresponding to the acoustic event type.

17 Claims, 5 Drawing Sheets

(56) References Cited

OTHER PUBLICATIONS

S. Ghaemmaghami, "Audio segmentation and classification based on a selective analysis scheme," 10th International Multimedia Modelling Conference, 2004. Proceedings., Brisbane, QLD, Australia, 2004, pp. 42-48, doi: 10.1109/MULMM.2004.1264965. (Year: 2004) (Year: 2004).*
European Patent Application No. 21187259.3 extended Search and Opinion dated Dec. 23, 2021, 13 pages.
Chinese Patent Application No. 202110037802.X, Office Action dated Sep. 29, 2023, 6 pages.
Chinese Patent Application No. 202110037802.X, English translation of Office Action dated Sep. 29, 2023, 12 pages.

* cited by examiner

METHOD AND APPARATUS FOR CONTROLLING DEVICE, AND READABLE STORAGE MEDIUM

CROSS REFERENCE TO RELATED APPLICATIONS

This application claims priority to Chinese Patent Application No. 202110037802.X, filed on Jan. 12, 2021, the content of which is incorporated herein by reference in its entirety.

TECHNICAL FIELD

The present disclosure relates to a field of artificial intelligence (AI) technologies, particularly to a method and an apparatus for controlling a device, and a readable storage medium.

BACKGROUND

With the continuous development of voice interaction technology, more and more devices are equipped with a voice interaction function. For example, the voice interaction function may be configured in a smart speaker, a smart air conditioner, a smart television, a smart air cleaner, etc., to achieve voice control and interaction. In order to control a smart device, the user usually needs to wake up a smart voice assistant in the smart device through wake-up words or keywords, and then issue instructions to the smart voice assistant. That is, the user is required to perform secondary interaction with the smart voice assistant (for example, wake-up interaction and instruction interaction), so that the computing workload of the smart device is large, and the control efficiency of the smart device is low for the user, thereby leading to a poor user experience.

SUMMARY

According to a first aspect of the embodiment of the present disclosure, a method for controlling a device is provided. The method includes: collect audio data where the device is located; determining whether each target frame of the audio data collected is a first type signal; in response to the target frame of the audio data being the first type signal, determining an acoustic event type represented by the first type signal; controlling the device to execute control instructions corresponding to the acoustic event type.

According to a second aspect of the embodiment of the present disclosure, an apparatus for controlling a device is provided. The apparatus includes: a processor; and a memory configured to store instructions executable by the processor. The processor is configured to: collect audio data where a device is located; determine whether each target frame of the audio data collected is the first type signal; in response to the target frame of the audio data being the first type signal, determine an acoustic event type represented by the first type signal; control the device to execute control instructions corresponding to the acoustic event type.

According to a third aspect of embodiments of the present disclosure, a computer readable storage medium having computer program instructions stored thereon is provided, in which the computer instructions are executed by a processor to implement the method according to the first aspect of the present disclosure.

It should be noted that, the details above and in the following are exemplary and illustrative, and do not constitute the limitation on the present disclosure.

BRIEF DESCRIPTION OF THE DRAWINGS

The drawings herein are incorporated into the specification and constitute a part of the specification, show embodiments in conformity with embodiments of the present disclosure, and explain the principle of the present disclosure together with the specification.

DETAILED DESCRIPTION

The example embodiments will be described in detail here, and examples thereof are shown in the accompanying drawings. When the following description refers to the accompanying drawings, unless otherwise indicated, the same numbers in different drawings represent the same or similar elements. The implementations described in the following example embodiments do not represent all the implementations consistent with the present invention. Rather, they are merely examples of the apparatuses and methods consistent with some aspects of the present invention as recited in the appended claims.

Figure 1:
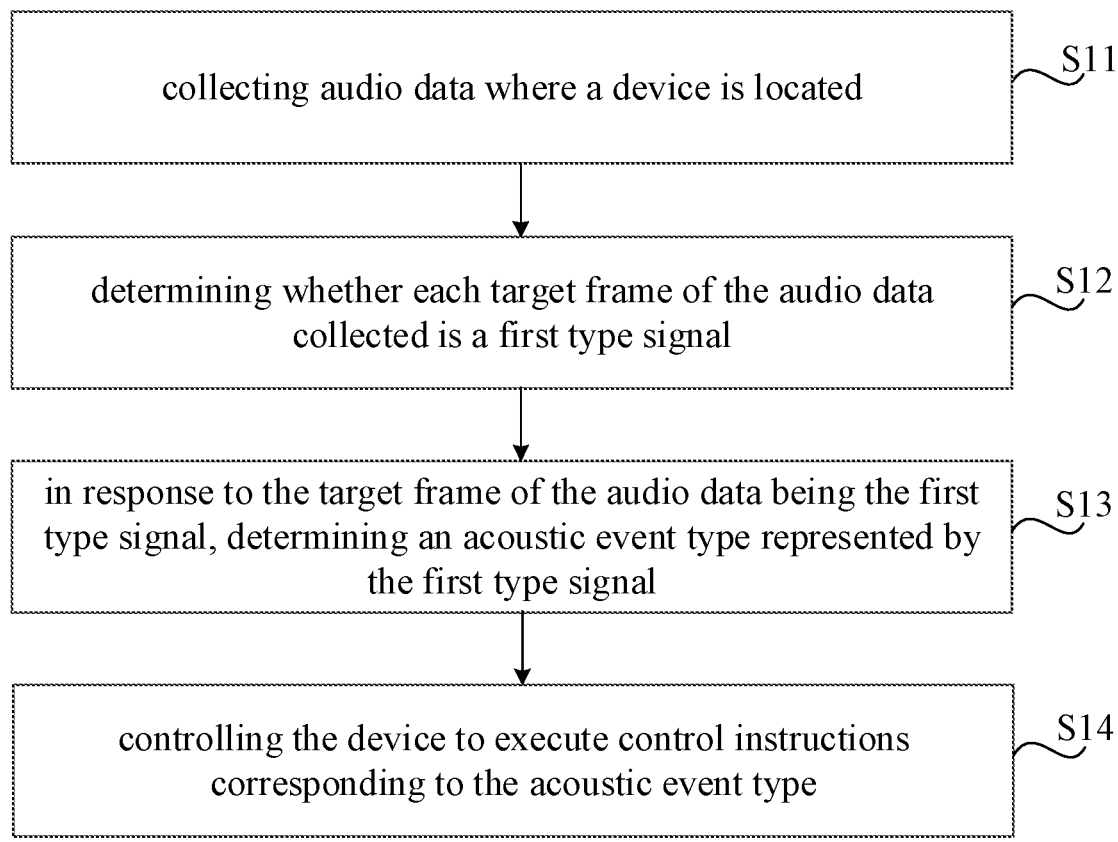
FIG. 1 is a flowchart illustrating a method for controlling a device according to an example embodiment.

FIG. 1 is a flowchart illustrating a method for controlling a device according to an example embodiment. As illustrated in FIG. 1, the method includes the following blocks.

At block S11, audio data is collected.

In an example, a device configured to execute a method for controlling a device according to the present disclosure may be an electronic device to be controlled. After the electronic device is powered on, an audio collecting module in the electronic device may collect in real time or periodically any audio data in the environment where the electronic device is located.

In another example, a device configured to execute a method for controlling a device according to the present disclosure may be other electronic device or server than the electronic device to be controlled. After other electronic device or server is powered on, an audio collecting module may collect in real time or periodically any audio data in the environment where the electronic device is located.

At block S12, it is determined whether a target frame of audio data is a first type signal for each target frame of audio data collected.

In the present disclosure, the target frame of the audio data may be each frame of audio data in the collected audio data, and also may be each frame of audio data collected behind a preset number of frames, and may also be each frame of audio data in any multiple frames of audio data (for example, multiple frames of audio data extracted from the collected audio data according to a preset rule) in the collected audio data, etc., which is not limited in the present disclosure. In addition, the specific implementation of determining whether the target frame of the audio data is the first type signal will be described below.

At block S13, in response to the target frame of the audio data being the first type signal, an acoustic event type represented by the first type signal is determined.

In the present disclosure, the acoustic event type represented by the first type signal refers to an acoustic event that generates the first type signal. In an example, the first type signal is an impulse signal, and the impulse signal is characterized by a short duration, large amplitude energy changes and aperiodicity. Therefore, the audio data generated by clapping, the audio data generated by finger-snapping, and the audio data generated by collision belong to impulse signals. Accordingly, in the present disclosure, the acoustic event type represented by the impulse signal may be a clapping event, a finger-snapping event, a coughing event, and a collision event, etc. It should be noted that, in practical applications, the first type signal may further be a non-impulse signal, which is not specifically limited here.

The specific implementation of determining an acoustic event type represented by the first type signal will be described below.

At block S14, the device is controlled to execute control instructions corresponding to the acoustic event type.

In the present disclosure, control instructions corresponding to different acoustic event types may be preset. In response to determining that the target frame of the audio data is the first type signal, an acoustic event type represented by the first type signal is further determined and the device is controlled to execute the control instructions corresponding to the acoustic event type. Different acoustic event types correspond to different control instructions. For example, when the acoustic event type of the first type signal is the clapping event, the corresponding control instructions may be control instructions configured to represent turning on the television. For another example, when the acoustic event type of the first type signal is the snapping event, the corresponding control instructions may be control instructions configured to represent pausing playing.

In an example, controlling the device to execute the control instructions corresponding to the acoustic event type may include: controlling the device to execute the control operations corresponding to the acoustic event type without waking up a smart voice assistant of the device.

For example, when the preset control operation corresponding to the first type signal representing the clapping event is to turn on the television, the device or the server executing the method for controlling a device controls the television to perform the operation of turning on the television without waking up the smart voice assistant of the television in response to determining that the target frame of the audio data is the first type signal representing the clapping event.

With the above technical solution, in response to determining that the target frame of the audio data is the first type signal, the acoustic event type represented by the first type signal is further determined, and the device is further controlled to execute the control instructions corresponding to the acoustic event type. In this way, not only the generation of the first type signal may be detected, but also the acoustic event type represented by the first type signal may be further judged and the instructions for controlling the device corresponding to different acoustic event types may be differentiated, thereby improving the robustness of controlling the device. Moreover, in response to determining the acoustic event type represented by the first type signal, the device may be directly controlled to execute the control instructions corresponding to the acoustic event type, which reduces the calculation amount and resource consumption of device operation, improves the control efficiency of the device, and improves the user experience.

Figure 2:
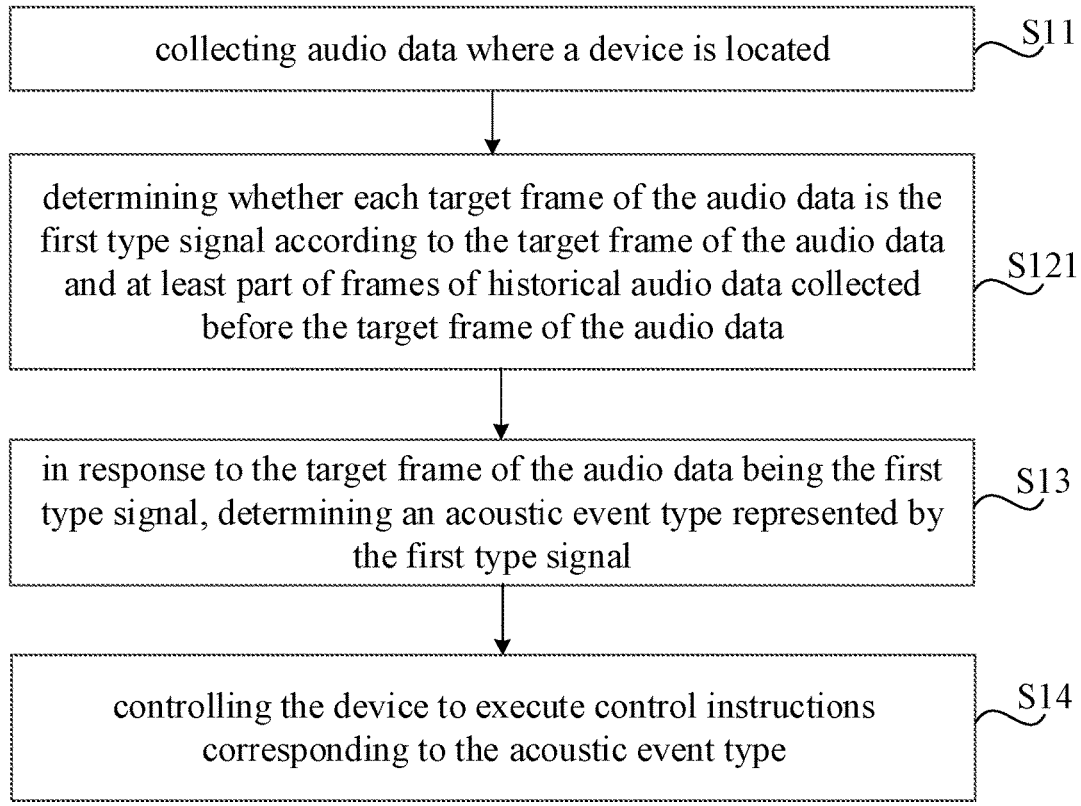
FIG. 2 is a flowchart illustrating another method for controlling a device according to an example embodiment.

FIG. 2 is a flowchart illustrating another method for controlling a device according to an example embodiment. As illustrated in FIG. 2, block S12 in FIG. 1 may include block S121.

At block S121, it is determined whether each target frame of audio data is the first type signal according to the target frame of the audio data and at least part of frames of historical audio data collected before collecting the target frame of the audio data.

Taking the target frame of the audio data being each frame of audio data collected as an example, it is explained in regards to determining whether the target frame of the audio data being the first type signal according to the target frame of the audio data and the at least part of frames of the historical audio data collected before the target frame of the audio data.

First, it is determined whether at least third preset number of frames of the historical audio data have been collected before collecting the target frame of the audio data; in response to determining that the at least third preset number of frames of the historical audio data have been collected before collecting the target frame of the audio data, it is determined whether the target frame of the audio data is the first type signal according to at least third preset number of frames of the historical audio data and the target frame of the audio data; or in response to determining that the at least third preset number of frames of the historical audio data have not been collected before collecting the target frame of the audio data, it is determined whether the target frame of the audio data is the first type signal according to the target frame of the audio data and the collected historical audio data.

In an example, assuming that the third preset number is 3, when a first frame of audio data collected is not the first type signal in default, it is determined whether a second frame of audio data is the first type signal according to the first frame of audio data and the second frame of audio data, and it is determined whether a third frame of audio data is the first type signal according to the first frame of audio data, the second frame of audio data and the third frame of audio data. For each target frame of audio data behind the third frame of audio data, it is determined whether the target frame of the audio data is the first type signal according to the target frame of the audio data and the third preset number of frames of the historical audio data before the target frame of the audio data. For example, it is determined whether a fourth frame of audio data is the first type signal according to the first frame of audio data, the second frame of audio data and the third frame of audio data.

It may be determined whether the target frame of the audio data is the first type signal with reference to the above-described way of determining whether the target frame of the audio data is the first type signal, which is not repeated here.

In this way, it may refer to different numbers of frames of the historical audio data to improve the flexibility of determining whether the target frame of the audio data is the first type signal, and due to determining whether the frame of audio data is the first type signal with reference to the historical audio data before the frame of audio data, the accuracy of determining whether the frame of audio data is the first type signal is improved.

In an embodiment, taking the first type signal being an impulse signal as an example, it may be determined whether the first type signal is the impulse signal in the following way.

Figure 3:
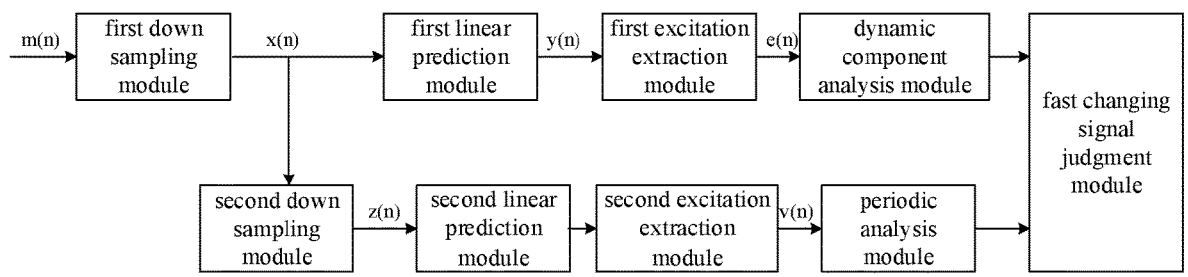
FIG. 3 is a diagram illustrating a method for determining whether audio data is impulse signal data according to an example embodiment.

In an example, FIG. 3 is a diagram illustrating a method for determining whether audio data is impulse signal data in the embodiment of the present disclosure. As illustrated in FIG. 3, m(n) represents the target frame of the audio data corresponding to an nth sampling point.

Firstly, the target frame of the audio data m(n) corresponding to the nth sampling point is input to a first down sampling module to obtain audio data x(n), the audio data x(n) is input to a first linear prediction module to obtain audio data y(n), the audio data y(n) is input to a first excitation extraction module to extract e(n), and the e(n) is input to a dynamic component analysis module to analyze whether the audio data is data with large dynamic component changes. Meanwhile, the audio data x(n) is input to a second down sampling module to obtain audio data z(n), the audio data z(n) is input to a second linear prediction module and a second excitation extraction module in sequence to obtain audio data v(n), and the audio data v(n) is input to a periodic analysis module to determine whether the audio data is a periodic signal. Finally, the respective results output by the dynamic component analysis module and the periodic analysis module are input to a fast changing signal judgment module to determine whether the audio data is an impulse signal by the fast changing signal judgment module.

The specific analysis process of the dynamic component analysis module is as follows:

First, an envelope signal env(n) is analyzed by a first low pass filter. For example, the envelope signal env(n) may be determined by the following formula, where decides a cut-off frequency of the first low pass filter.

$$env(n)=env(n-1)+\beta(|e(n)|-env(n-1))$$

where env(n−1) is an envelope signal of the audio data corresponding to a (n−1)th sampling point, and β is a value within the range of 0 to 1 set empirically.

Then, env(n) passes through a second low pass filter to obtain a low frequency signal flr(n). For example, the low frequency signal flr(n) may be determined by the following formula, where γ decides a cut-off frequency of the second low pass filter;

$$flr(n)=flr(n-1)+\gamma(env(n)-flr(n-1))$$

where flr(n−1) is a low frequency signal determined based on the audio data corresponding to the (n−1)th sampling point in a way as illustrated in FIG. 3, and γ is a value within the range of 0 to 1 set empirically.

Next, a relationship among env(n), flr(n) and a preset threshold is analyzed to determine whether the audio data is the data with large dynamic component changes. For example, it is determined that a relationship between env(n) and a product of flr(n) and the preset threshold. In response to env(n) being greater than the product of flr(n) and the preset threshold, the audio data is determined as the data with large dynamic component changes, otherwise, the audio data is determined as data with small dynamic component changes.

The specific analysis process of the periodic analysis module is as follows:

when the audio data is periodic data, its autocorrelation is also periodic. Therefore, in the embodiments, the periodicity of audio data may be judged by autocorrelation calculation of the audio data v(n). For example, an autocorrelation coefficient of the audio data v(n) may be calculated by the following formula, and it is determined whether the audio data is the periodic data according to the autocorrelation coefficient.

$$p_i = \sum_{n=0}^{M-1} v(n)g\gamma(N+i)$$

where $p_i$ represents an autocorrelation coefficient between the audio data v(n) and v(n+i) at a distance of i sampling points, in which, n is an nth sampling point, and M is a total number of sampling points.

When the audio data is data with large dynamic component changes and is aperiodic data, it is determined that the target frame of the audio data is the impulse signal.

In another embodiment, it may be determined whether the target frame of the audio data is the impulse signal by the following way:

First, respective initial spectral values (onset values) of the target frame of the audio data and at least part of frames of the audio data are obtained. For example, for each target frame of audio data, an Mel spectrum of the target frame of the audio data is obtained by a short-time fourier transform, the Mel spectrum of the target frame of the audio data minuses the Mel spectrum of the previous frame of audio data to obtain difference values, and a mean value of the obtained difference values is determined as the initial spectral value of the target frame of the audio data. In this way, the initial spectral value of each target frame of audio data may be calculated.

Then, in response to the initial spectral value of the target frame of the audio data meeting a preset condition, it is determined that the target frame of the audio data is the impulse signal. The preset condition is: the initial spectral value of the target frame of the audio data is a maximum value of the initial spectral values of the at least part of frames of the historical audio data, and the initial spectral value of the target frame of the audio data is greater than or equal to a mean value of the initial spectral values of the at least part of frames of the historical audio data and the target frame of audio data. That is, when the initial spectral value of the target frame of the audio data is the maximum value of the initial spectral values of the at least part of frames of the historical audio data, and the initial spectral value of the target frame of the audio data is greater than or equal to the mean value of the initial spectral values of the at least part of frames of the historical audio data and the initial spectral value of the target frame of the audio data, it is determined that the target frame of the audio data is the impulse signal, otherwise it is not the impulse signal.

Figure 4:
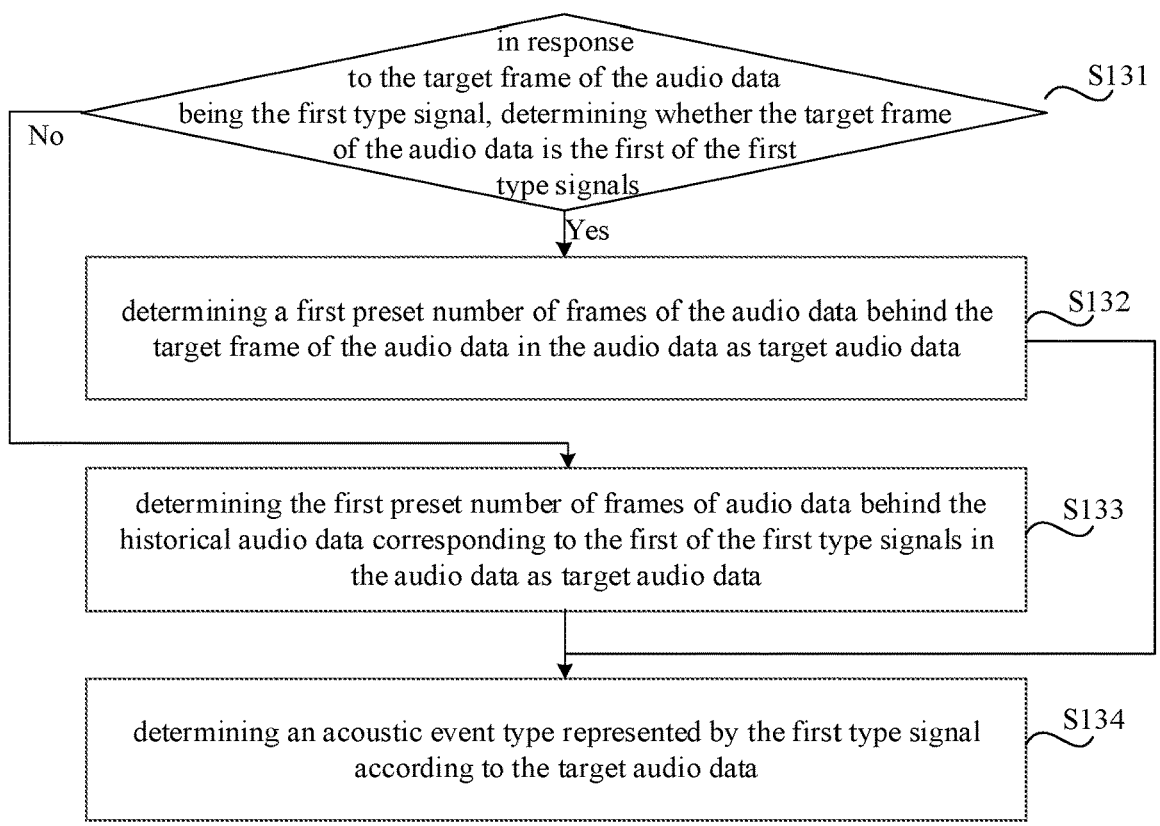
FIG. 4 is a flowchart illustrating determining an acoustic event type represented by the first type signal according to an example embodiment.

FIG. 4 is a flowchart illustrating determining an acoustic event type represented by the first type signal according to an example embodiment. As illustrated in FIG. 4, block S13 in FIG. 1 may further include blocks S131 to S134.

At block S131, in response to the target frame of the audio data being the first type signal, it is determined whether the target frame of the audio data is the first of the first type signals.

In an example, in response to the target frame of the audio data being the first type signal, it is determined whether the first type signals have occurred within a preset duration before collecting the target frame of the audio data; in response to determining that the first type signals have not occurred within the preset duration, it is indicated that a time interval between the first type signal determined this time and the first type signal determined last time is greater than or equal to the preset duration, the first type signal determined this time is considered as first impulse signal data, that is, the target frame of the audio data is the first of the first type signal. In response to determining that the first type signals have occurred within the preset duration, it is indicated that the time interval between the first type signal determined this time and the first type signal determined last time is less than the preset duration, the first type signal determined this time is not considered as the first impulse signal data, that is, the target frame of the audio data is not the first of the first type signal.

In response to determining that the target frame of the audio data is the first impulse signal data, block S132 is executed, otherwise block S133 is executed.

At block S132, a first preset number of frames of audio data behind the target frame of the audio data in the audio data are determined as target audio data. The target audio data includes a second preset number of first type signals, and the target frame of the audio data is a first frame of audio data in the target audio data.

In the present disclosure, the first preset number is related to the second preset number, which may be set according to the requirements and the experiment results. In an example, it may be determined in advance by the experiments how many frames of audio data behind the audio data corresponding to the first of first type signals need to be collected, to ensure that the collected audio data include the second preset number of first type signals, thereby determining the first preset number. For example, assuming that the second preset number is 2, when 48 frames of audio data are collected behind the audio data corresponding to the first of the first type signals, to ensure that the collected 48 frames of audio data include two first type signals, the first preset number is 48.

The control instructions corresponding to the second preset number of first type signals are preset by users, for example, the second preset number may be 1, 2, 3, etc. Assuming that the second preset number is 2, the determined target audio data need to include two first type signals. It should be noted that, in practical applications, the larger the second preset number is, the lower the probability of the device mistakenly executing control instructions is, and the greater the first preset number is.

It should be noted that, when the first preset number is determined, in addition to enabling the second preset number of first type signals to be included in the first preset number of frames of audio data, the first preset number needs to be minimized as much as possible to avoid that there is audio data with interference in the target audio data. For example, assuming the second preset number is 2 and the first of first type signals is denoted as the 1st frame of the audio data, the three experiments performed in advance respectively show that, the 48th frame of audio data behind the first of first type signals is the second of first type signals, the 49th frame of audio data behind the first of first type signals is the second of first type signals, and the 50th frame of audio data behind the first of first type signals is the second of first type signals, then the first preset number should be greater than or equal to 48. The first preset number may be 48 so that the determined number of the target audio data is as small as possible, thereby reducing the computation amount of the system operation.

At block S133, the first preset number of frames of audio data behind the historical audio data corresponding to the first of the first type signals in the audio data are determined as target audio data.

Before the target frame of the audio data is not the first of the first type signal, a certain frame of audio data before the target frame of the audio data in the collected audio data has been determined as the first of the first type signals. In this case, the first preset number of frames of audio data behind the historical audio data corresponding to the first of the first type signals in the audio data may be taken as target audio data. The historical audio data corresponding to the first of first type signals is a first frame of audio data in the target audio data.

After the target audio data is determined according to block S132 or block S133, block S134 is executed.

At block S134, an acoustic event type represented by the first type signal is determined according to the target audio data.

In the present disclosure, the acoustic event type represented by the first type signal included in the target audio data may be determined by deep learning. In an example, spectral feature data of the target audio data is firstly extracted, and the spectral feature data of the target audio data is input to a trained neural network model, to obtain the acoustic event type represented by the first type signal output by the neural network model.

In an example, after the target audio data is determined, the Mel spectral feature of each frame of audio data in the target audio data may be obtained and input to the trained neural network model to determine the acoustic event type represented by the first type signal. The neural network model may extract a deep feature based on the Mel spectral feature of each frame of audio data, and the acoustic event type represented by the first type signal is determined based on the deep feature.

In this way, the acoustic event type represented by the first type signal may be determined based on the deep feature of the target audio data extracted by the neural network model, to further improve the robustness of determining the acoustic event type represented by the first type signal.

In the present disclosure, the neural network model may be trained by the following way:

First, sample audio data of different acoustic event types are obtained. The acoustic event type of each frame of sample audio data is known. For example, sample audio data generated by the finger-snapping event, sample audio data generated by the collision event, sample audio data generated by the clapping event, etc. are obtained respectively. It should be noted that, a number of sample audio data is greater than or equal to a preset number.

Then, a Mel spectral feature of each frame of sample audio data is obtained.

Finally, during each training, Mel spectral features of a preset number of frames of sample audio data are taken as model input parameters, and tag data corresponding to the known acoustic event types of the first preset number of frames of sample audio data are taken as model input parameters to train a neural network model, further to obtain the trained neural network model.

The neural network model may be a time domain convolution structure that is characterized by few parameters and quick operating speed than other conventional neural network structures.

In an embodiment, a corresponding relationship between a number of first type signals for representing the acoustic event type and control instructions may be further preset, for example, when the number of first type signals for representing the clapping event is 2, the corresponding control instructions are configured to represent control instructions starting playing, and when the number of first type signals for representing the clapping event is 3, the corresponding control instructions are configured to represent control instructions pausing playing.

In the embodiment, the neural network model may recognize the number of first type signals for representing the acoustic event type included in the target audio data in addition to the acoustic event type represented by the first type signal. In this way, after a target number of first type signals for representing the acoustic event type, the control instructions corresponding to the target number are determined, and the device is controlled to execute the corresponding control operations according to the corresponding relationship between the preset number of first type signals for representing the acoustic event type and control instructions.

Figure 5:
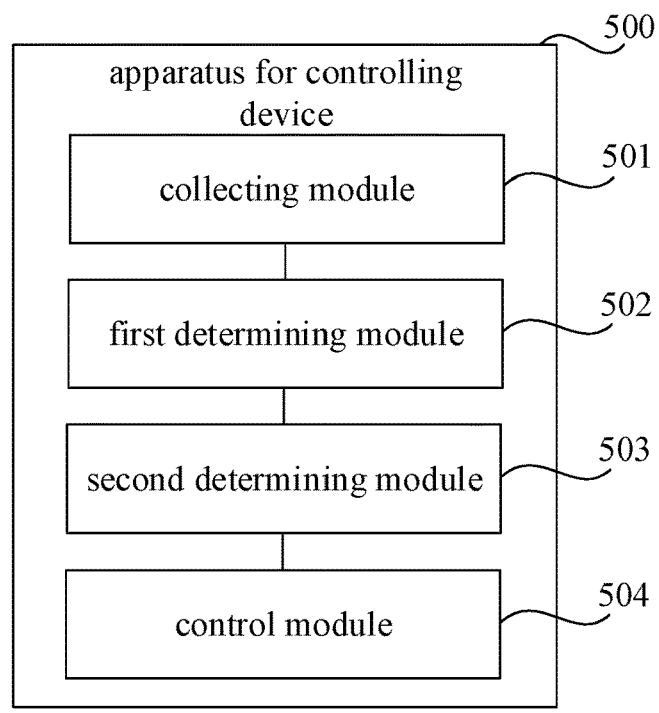
FIG. 5 is a block diagram illustrating an apparatus for controlling a device according to an example embodiment.

The disclosure further provides an apparatus for controlling a device based on the same invention concept. FIG. 5 is a block diagram illustrating an apparatus for controlling a device according to an example embodiment. As illustrated in FIG. 5, the apparatus 500 for controlling a device may include: a collecting module 501, a first determining module 502, a second determining module 503 and a control module 504. The collecting module 501 is configured to collect audio data. The first determining module 502 is configured to for each target frame of audio data collected, determine whether the target frame of the audio data is a first type signal. The second determining module 503 is configured to determine an acoustic event type represented by the first type signal in response to the target frame of the audio data being the first type signal. The control module 504 is configured to control the device to execute control instructions corresponding to the acoustic event type.

In at least one embodiment, the first determining module 502 is configured to: for each target frame of audio data, determine whether the target frame of the audio data is the first type signal according to the target frame of the audio data and at least part of frames of historical audio data collected before the target frame of the audio data.

In at least one embodiment, the first type signal is an impulse signal. The first determining module 502 may include: an obtaining submodule and a first determining submodule. The obtaining submodule is configured to obtain respective initial spectral values of the target frame of the audio data and the multiple frames of the historical audio data. The first determining submodule is configured to, in response to the initial spectral value of the target frame of the audio data meeting a preset condition, determine that the target frame of the audio data is the impulse signal. The preset condition is: the initial spectral value of the target frame of the audio data is a maximum value of the initial spectral values of the at least part of frames of the historical audio data, and the initial spectral value of the target frame of the audio data is greater than or equal to a mean value of the initial spectral values of the at least part of frames of the historical audio data and the target frame of the audio data.

In at least one embodiment, in response to the target frame of the audio data being the first type signal, the second determining module 503 may include: a second determining submodule, a third determining submodule, a fourth determining submodule and a fifth determining submodule. The second determining submodule is configured to, in response to the target frame of the audio data being the first type signal, determine whether the target frame of the audio data is the first of the first type signals. The third determining submodule is configured to, in response to the target frame of the audio data being the first impulse signal, determine a first preset number of frames of audio data behind the target frame of the audio data in the audio data as target audio data, in which, the target audio data include a second preset number of first type signals. The fourth determining submodule is configured to, in response to the target frame of the audio data not being the first of the first type signals, determine the first preset number of frames of audio data behind historical audio data corresponding to the first of first type signals in the audio data as target audio data. The fifth determining submodule is configured to determine the acoustic event type represented by the first type signal according to the target audio data.

In at least one embodiment, the fifth determining submodule is configured to extract spectral feature data of the target audio data; and input spectral feature data of the target audio data into a neural network model, to obtain the acoustic event type represented by the first type signal output by the neural network model, in which the neural network model is trained according to the spectral feature data of sample audio data of a plurality of acoustic event types.

In at least one embodiment, the second determining submodule is configured to: in response to the target frame of the audio data being the first type signal, determine whether the first type signals have occurred within a preset duration before collecting the target frame of the audio data; in response to determining that the first type signals have not occurred within the preset duration, determine the target frame of the audio data is the first of the first type signals; and in response to determining that the first type signals have occurred within the preset duration, determine the target frame of the audio data is not the first of the first type signals.

In at least one embodiment, the target frame of the audio data is each frame of audio data collected; the first determining module 502 may include: a sixth determining submodule, a seventh determining submodule and a eighth determining submodule. The sixth determining submodule is configured to determine whether at least third preset number of frames of the historical audio data have been collected before collecting the target frame of the audio data. The seventh determining submodule is configured to, in response to determining that the at least third preset number of frames of the historical audio data have been collected before collecting the target frame of the audio data, determine whether the target frame of the audio data is the first type signal according to the target frame of the audio data and the third preset number of frames of the historical audio data before collecting the target frame of the audio data. The eighth determining submodule is configured to, in response to determining that the at least third preset number of frames of the historical audio data have not been collected before collecting the target frame of the audio data, determine whether the target frame of the audio data is the first type signal according to the target frame of the audio data and the collected historical audio data.

In at least one embodiment, the control module 504 is configured to control the device to execute control operations corresponding to the acoustic event type without waking up a smart voice assistant of the device.

With regard to the apparatus in the above embodiments, the specific implementation in which each module performs the operation has been described in detail in the embodiments of the method and will not be elaborated here.

The present disclosure provides a computer readable storage medium having computer program instructions stored thereon, in which the computer instructions are executed by a processor to implement the steps of the method for controlling a device according to the present disclosure.

Figure 6:
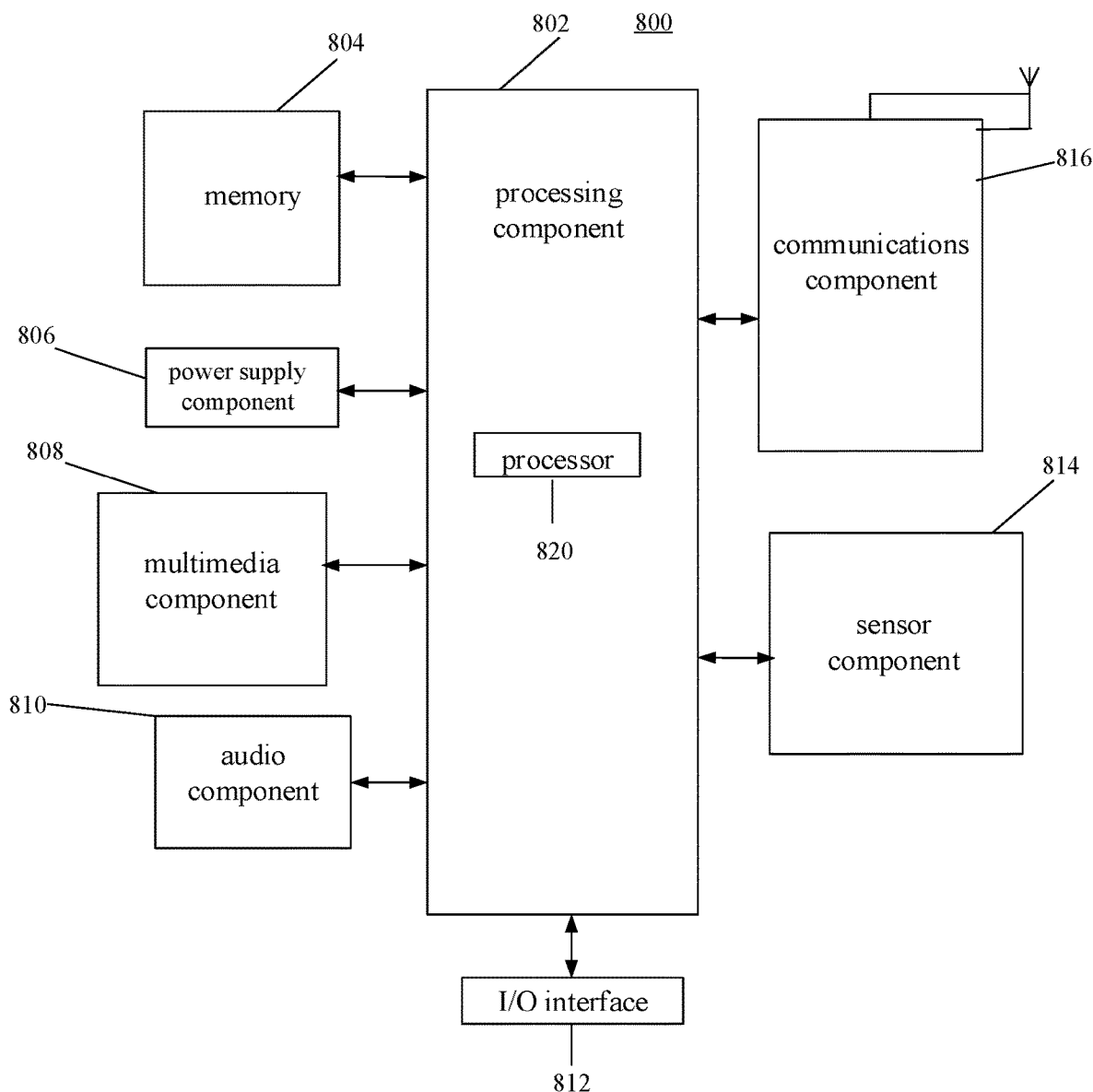
FIG. 6 is a block diagram illustrating an apparatus for controlling a device according to an example embodiment.

FIG. 6 is a block diagram illustrating an apparatus for controlling a device according to an example embodiment. For example, an apparatus 800 may be a mobile phone, a computer, a digital broadcasting terminal, a messaging device, a game console, a tablet device, a medical equipment, a fitness equipment, a personal digital assistant, etc.

Referring to FIG. 6, the apparatus 800 may include one or more components: a processing component 802, a memory 804, a power supply component 806, a multimedia component 808, an audio component 810, an input/output (I/O) interface 812, a sensor component 814, and a communication component 816.

The processing component 802 generally controls the overall operation of the apparatus 800, such as the operations related to display, phone calls, data communications, camera operations and recording operations. The processing component 802 may include one or more processors 820 for executing instructions to complete all or part of steps of the method for controlling a device. In addition, the processing component 802 may include one or more modules for the convenience of interactions between the processing component 802 and other components. For example, the processing component 802 may include a multimedia module for the convenience of interactions between the multimedia component 808 and the processing component 802.

The memory 804 is configured to store various types of data to support the operation of the apparatus 800. Examples of such data include the instructions for any applications or methods operating on apparatus 800, contact data, phone book data, messages, pictures, videos, etc. The memory 804 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 806 may provide power supply for various components of the apparatus 800. The power supply component 806 may include a power supply management system, one or more power supplies, and other components related to generating, managing and distributing power for the apparatus 800.

The multimedia component 808 includes a screen that provides an output interface between the apparatus 800 and the user. In some embodiments, a screen may include a liquid crystal display (LCD) and a touch panel (TP). If the screen includes a touch panel, the screen may be implemented as a touch screen to receive input signals from the user. The touch panel includes one or more touch sensors to sense touches, swipes and gestures on the touch panel. The touch sensors may not only sense a boundary of the touch or swipe action, but also sense a duration and a pressure related to the touch or swipe operation. In some embodiments, the multimedia component 808 include a front camera and/or a rear camera. When the apparatus 800 is in operation mode, such as shooting mode or video mode, the front camera or the rear camera may receive external multimedia data. Each of the front camera and rear camera may be a fixed optical lens system or an optical lens system or have focal length and optical zoom capacity.

The audio component 810 is configured as output and/or input signal. For example, the audio component 810 includes a microphone (MIC). When the apparatus 800 is in operation mode, such as a call mode, a recording mode, and a speech recognition mode, the microphone is configured to receive external audio signals. The audio signals received may be further stored in the memory 804 or sent via the communication component 816. In some embodiments, the audio component 810 further includes a speaker to output an audio signal.

The I/O interface 812 provides an interface for the processing component 802 and the peripheral interface module, and the peripheral interface module may be a keyboard, a click wheel, a button, etc. These buttons may include but not limited to a home button, a volume button, a start button and a lock button.

The sensor component 814 includes one or more sensors, configured to provide various aspects of state evaluation for the apparatus 800. For example, the sensor component 814 may detect an on/off state of the apparatus 800 and relative positioning of the component, such as a display and a keypad of the apparatus 800. The sensor component 814 may further detect a location change of the apparatus 800 or a component of the apparatus 800, a presence or absence of user contact with the apparatus 800, an orientation or an acceleration/deceleration of the apparatus 800, and a temperature change of the apparatus 800. The sensor component 814 may include a proximity sensor, which is configured to detect the presence of the objects nearby without any physical contact. The sensor component 814 may further include a light sensor such as a CMOS or a CCD image sensor for use in imaging applications. In some embodiments, the sensor component 814 may further include an acceleration transducer, a gyroscope sensor, a magnetic sensor, a pressure sensor or a temperature sensor.

The communication component 816 is configured for the convenience of wire or wireless communication between the apparatus 800 and other devices. The apparatus 800 may access wireless networks based on communication standard, such as WiFi, 2G or 3G, or their combination. In an exemplary embodiment, the communication component 816 receives broadcast signals or broadcast-related information from an external broadcast management system via a broadcast channel. In an exemplary embodiment, the communication component 816 further includes a near field communication (NFC) module to facilitate short-range communication. For example, the NFC module may be implemented based on a radio frequency identification (RFID) technology, an infrared data association (IRDA) technology, an ultra-wideband (UWB) technology, a bluetooth (BT) technology and other technologies.

In an embodiment, the apparatus 800 may be implemented by one or more application specific integrated circuits(ASIC), digital signal processors (DSP), digital signal processing devices (DSPD), programmable logic devices (PLD), field programmable gate arrays (FPGA), controllers, microcontrollers, microprocessors or other electronics components, which is configured to perform the method for controlling a device.

In an embodiment, a non-transitory computer readable storage medium is further provided, such as the memory 804 including instructions. The instructions may be executed by the processor 820 of the apparatus 800 to complete the method for controlling a device. For example, the non-transitory computer readable storage medium may be a ROM, a random access memory (RAM), a CD-ROM, a magnetic tape, a floppy disk, an optical data storage device, etc.

In another embodiment, a computer program product is further provided. The computer program product includes computer programs that may be executed by a programmable apparatus, and the computer program possesses a code part configured to execute the above method for controlling a device when executed by the programmable apparatus.

Figure 7:
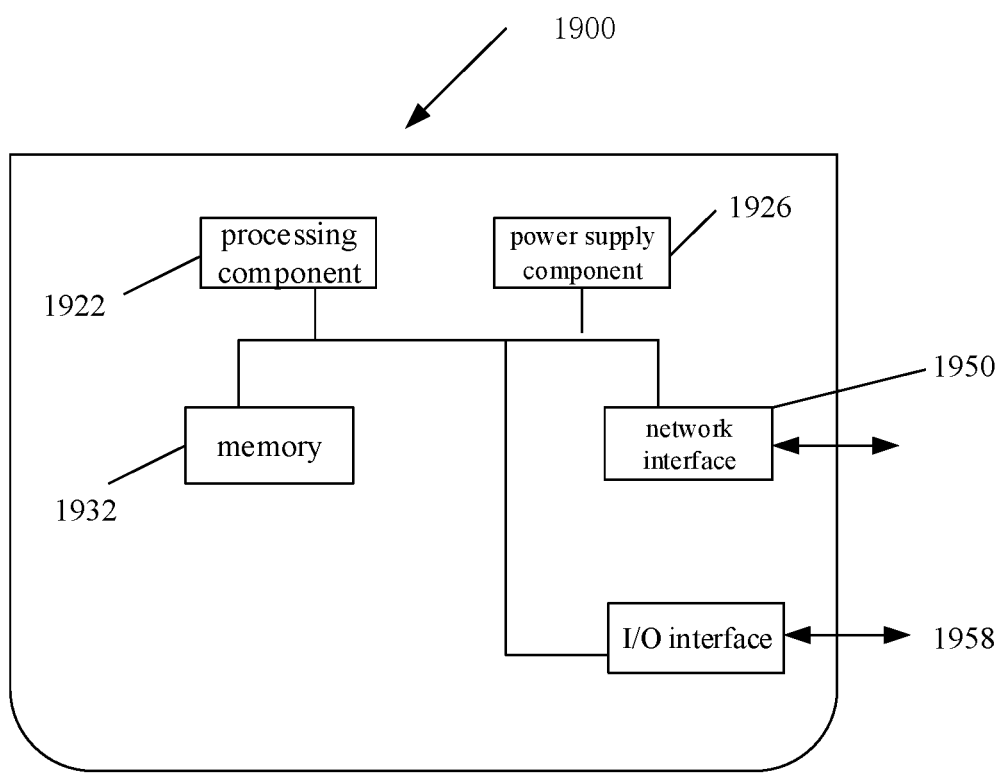
FIG. 7 is a block diagram illustrating an apparatus for controlling a device according to an example embodiment.

FIG. 7 is a block diagram illustrating an apparatus for controlling a device according to an example embodiment. For example, the apparatus 1900 may be provided as a server. Referring to FIG. 7, the apparatus 1900 includes a processing component 1922, which further includes one or more processors, and memory resources represented by the memory 1932, which are configured to store instructions executed by the processing component 1922, for example, an application. The applications stored in the memory 1932 may include one or more modules each of which corresponds to a set of instructions. In addition, the processing component 1922 is configured to execute instructions, to implement a method for controlling a device described above.

The apparatus 1900 may further include one power supply component 1926 configured to execute power management of the apparatus 1900, and one wired or wireless network interface 1950 configured to connect the apparatus 1900 to a network, and one input/output (I/O) interface 1958. The apparatus 1900 may operate an operating system stored in the memory 1932, for example, Windows Server™, Mac OS X™, Unix™, Linux™, FreeBSD™, etc.

After considering the specification and practicing the disclosure herein, those skilled in the art will easily think of other implementations. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary only, and the true scope and spirit of the present disclosure are given by the appended claims.

It should be understood that the present invention is not limited to the precise structure described above and shown in the drawings, and various modifications and changes may be made without departing from its scope. The scope of the present application is only limited by the appended claims. The scope of the present application is only limited by the appended claims.

What is claimed is:

1. A method for controlling a device, comprising:
   collecting audio data where the device is located;
   determining whether each target frame of the audio data collected is a first type signal;
   in response to the target frame of the audio data being the first type signal, determining an acoustic event type represented by the first type signal; and
   controlling the device to execute control instructions corresponding to the acoustic event type;
   wherein determining the acoustic event type represented by the first type signal in response to the target frame of the audio data being the first type signal, comprises:
   in response to the target frame of the audio data being the first type signal, determining whether the target frame of the audio data is the first of the first type signals;
   in response to the target frame of the audio data being the first of the first type signals, determining a first preset number of frames of the audio data behind the target frame of the audio data in the audio data as target audio data, wherein, the target audio data comprises a second preset number of first type signals;
   in response to the target frame of the audio data not being the first of the first type signals, determining the first preset number of frames of the audio data behind historical audio data corresponding to the first of first type signals in the audio data as the target audio data; and
   determining the acoustic event type represented by the first type signal according to the target audio data.

2. The method of claim 1, wherein, determining whether each target frame of the audio data is the first type signal, comprises:
   determining whether each target frame of the audio data is the first type signal according to the target frame of the audio data and at least part of frames of historical audio data collected before the target frame of the audio data.

3. The method of claim 2, wherein, the first type signal is an impulse signal, determining whether each target frame of the audio data is the first type signal according to the target frame of the audio data and at least part of frames of historical audio data collected before the target frame of the audio data, comprises:
   obtaining respective initial spectral values of the target frame of the audio data and the at least part of frames of the historical audio data; and
   in response to the initial spectral value of the target frame of the audio data meeting a preset condition, determining that the target frame of the audio data is the impulse signal;
   wherein, the preset condition includes: the initial spectral value of the target frame of the audio data is a maximum value of the initial spectral values of the at least part of frames of the historical audio data, and the initial spectral value of the target frame of the audio data is greater than or equal to a mean value of the initial spectral values of the at least part of frames of the historical audio data and the target frame of the audio data.

4. The method of claim 2, wherein, the target frame of the audio data is each frame of audio data collected, and determining whether the target frame of the audio data is the first type signal according to the target frame of the audio data and the at least part of frames of historical audio data collected before the target frame of the audio data, comprises:
   determining whether at least third preset number of frames of the historical audio data have been collected before collecting the target frame of the audio data;
   in response to determining that the at least third preset number of frames of the historical audio data have been collected before collecting the target frame of the audio data, determining whether the target frame of the audio data is the first type signal according to the target frame of the audio data and the third preset number of frames of the historical audio data collected; and
   in response to determining that the at least third preset number of frames of the historical audio data have not been collected before collecting the target frame of the audio data, determining whether the target frame of the audio data is the first type signal according to the target frame of the audio data and the collected historical audio data.

5. The method of claim 1, wherein, determining the acoustic event type represented by the first type signal according to the target audio data, comprises:
    extracting spectral feature data of the target audio data; and
    inputting the spectral feature data of the target audio data into a neural network model, to obtain the acoustic event type represented by the first type signal output by the neural network model, wherein the neural network model is trained according to spectral feature data of sample audio data of a plurality of acoustic event types.

6. The method of claim 1, wherein, in response to the target frame of audio data being the first type signal, determining whether the target frame of audio data is the first of the first type signals, comprises:
    in response to the target frame of the audio data being the first type signal, determining whether the first type signals have occurred within a preset duration before collecting the target frame of the audio data;
    in response to determining that the first type signals have not occurred within the preset duration, determining the target frame of audio data is the first of the first type signals; and
    in response to determining that the first type signals have occurred within the preset duration, determining the target frame of the audio data is not the first of the first type signals.

7. The method of claim 1, wherein, controlling the device to execute control instructions corresponding to the acoustic event type, comprises:
    controlling the device to execute control operations corresponding to the acoustic event type without waking up a smart voice assistant of the device.

8. An apparatus for controlling a device, comprising:
    a processor; and
    a memory configured to store instructions executable by the processor;
    wherein, the processor is configured to:
    collect audio data where the device is located;
    determine whether each target frame of the audio data collected is a first type signal;
    in response to the target frame of the audio data being the first type signal, determine an acoustic event type represented by the first type signal; and
    control the device to execute control instructions corresponding to the acoustic event type;
    wherein the processor is further configured to:
    in response to the target frame of the audio data being the first type signal, determine whether the target frame of the audio data is the first of the first type signals;
    in response to the target frame of the audio data being the first of the first type signals, determine a first preset number of frames of the audio data behind the target frame of the audio data in the audio data as target audio data, wherein the target audio data comprises a second preset number of first type signals;
    in response to the target frame of audio data not being the first of the first type signals, determine the first preset number of frames of the audio data behind historical audio data corresponding to the first of first type signals in the audio data as the target audio data; and
    determine the acoustic event type represented by the first type signal according to the target audio data.

9. The apparatus of claim 8, wherein the processor is further configured to:
    determine whether each target frame of the audio data is the first type signal according to the target frame of the audio data and at least part of frames of historical audio data collected before the target frame of the audio data; and
    wherein the first type signal is an impulse signal, and the processor is further configured to:
    obtain respective initial spectral values of the target frame of the audio data and the at least part of frames of the historical audio data; and
    in response to the initial spectral value of the target frame of the audio data meeting a preset condition, determine that the target frame of the audio data is the impulse signal;
    wherein the preset condition includes: the initial spectral value of the target frame of the audio data is a maximum value of the initial spectral values of the at least part of frames of the historical audio data, and the initial spectral value of the target frame of the audio data is greater than or equal to a mean value of the initial spectral values of the at least part of frames of the historical audio data and the target frame of the audio data.

10. The apparatus of claim 9, wherein the target frame of the audio data is each frame of audio data collected, and wherein the processor is further configured to:
    determine whether at least third preset number of frames of the historical audio data have been collected before collecting the target frame of the audio data;
    in response to determining that the at least third preset number of frames of the historical audio data have been collected before collecting the target frame of the audio data, determine whether the target frame of the audio data is the first type signal according to the target frame of the audio data and the third preset number of frames of the historical audio data collected; and
    in response to determining that the at least third preset number of frames of the historical audio data have not been collected before collecting the target frame of the audio data, determine whether the target frame of the audio data is the first type signal according to the target frame of the audio data and the collected historical audio data.

11. The apparatus of claim 8, wherein the processor is further configured to:
    extract spectral feature data of the target audio data; and
    input the spectral feature data of the target audio data into a neural network model, to obtain the acoustic event type represented by the first type signal output by the neural network model, wherein the neural network model is trained according to spectral feature data of sample audio data of a plurality of acoustic event types.

12. The apparatus of claim 8, wherein the processor is further configured to:
    in response to the target frame of the audio data being the first type signal, determine whether the first type signals have occurred within a preset duration before collecting the target frame of the audio data;
    in response to determining that the first type signals have not occurred within the preset duration, determine the target frame of audio data is the first of the first type signals; and in response to determining that the first type signals have occurred within the preset duration, determine the target frame of the audio data is not the first of the first type signals.

13. A non-transitory computer readable storage medium having computer instructions stored thereon, wherein the computer instructions are configured to cause a computer to execute a method for controlling a device, the method comprising:
- collecting audio data where the device is located;
- determining whether each target frame of the audio data collected is a first type signal;
- in response to the target frame of the audio data being the first type signal, determining an acoustic event type represented by the first type signal; and
- controlling the device to execute control instructions corresponding to the acoustic event type;
- wherein determining the acoustic event type represented by the first type signal in response to the target frame of the audio data being the first type signal, comprises:
- in response to the target frame of the audio data being the first type signal, determining whether the target frame of the audio data is the first of the first type signals;
- in response to the target frame of the audio data being the first of the first type signals, determining a first preset number of frames of audio data behind the target frame of the audio data in the audio data as target audio data, wherein, the target audio data comprises a second preset number of first type signals;
- in response to the target frame of the audio data not being the first of the first type signals, determining the first preset number of frames of the audio data behind historical audio data corresponding to the first of first type signals in the audio data as the target audio data; and
- determining the acoustic event type represented by the first type signal according to the target audio data.

14. The storage medium of claim 13, wherein, determining whether each the target frame of the audio data is the first type signal, comprises: determining whether each target frame of the audio data is the first type signal according to the target frame of the audio data and at least part of frames of historical audio data collected before the target frame of audio data;
- wherein the first type signal is an impulse signal, determining whether each target frame of the audio data is the first type signal according to the target frame of the audio data and at least part of frames of historical audio data collected before the target frame of audio data, comprises:
- obtaining respective initial spectral values of the target frame of the audio data and the at least part of frames of the historical audio data; and
- in response to the initial spectral value of the target frame of the audio data meeting a preset condition, determining that the target frame of the audio data is the impulse signal;
- wherein, the preset condition includes: the initial spectral value of the target frame of the audio data is a maximum value of the initial spectral values of the at least part of frames of the historical audio data, and the initial spectral value of the target frame of the audio data is greater than or equal to a mean value of the initial spectral values of the at least part of frames of the historical audio data and the target frame of the audio data.

15. The storage medium of claim 14, wherein the target frame of the audio data is each frame of audio data collected, and determining whether the target frame of the audio data is the first type signal according to the target frame of the audio data and the at least part of frames of the historical audio data collected before the target frame of the audio data, comprises:
- determining whether at least third preset number of frames of the historical audio data have been collected before collecting the target frame of the audio data;
- in response to determining that the at least third preset number of frames of the historical audio data have been collected before collecting the target frame of the audio data, determining whether the target frame of the audio data is the first type signal according to the target frame of the audio data and the third preset number of frames of the historical audio data collected; and
- in response to determining that the at least third preset number of frames of the historical audio data have not been collected before collecting the target frame of the audio data, determining whether the target frame of the audio data is the first type signal according to the target frame of the audio data and the collected historical audio data.

16. The storage medium of claim 13, wherein, determining the acoustic event type represented by the first type signal according to the target audio data, comprises:
- extracting spectral feature data of the target audio data; and
- inputting the spectral feature data of the target audio data into a neural network model, to obtain the acoustic event type represented by the first type signal output by the neural network model, wherein the neural network model is trained according to spectral feature data of sample audio data of a plurality of acoustic event types.

17. The storage medium of claim 13, wherein in response to the target frame of audio data being the first type signal, determining whether the target frame of audio data is the first of the first type signals, comprises:
- in response to the target frame of the audio data being the first type signal, determining whether the first type signals have occurred within a preset duration before collecting the target frame of the audio data;
- in response to determining that the first type signals have not occurred within the preset duration, determining the target frame of the audio data is the first of the first type signals; and
- in response to determining that the first type signals have occurred within the preset duration, determining the target frame of the audio data is not the first of the first type signals.

* * * * *